US006615142B1

(12) United States Patent
Hovde

(10) Patent No.: US 6,615,142 B1
(45) Date of Patent: Sep. 2, 2003

(54) FILTERING TO MEASURE GAS CONCENTRATIONS FROM SPECTRAL FEATURES

(75) Inventor: David Christian Hovde, Cincinnati, OH (US)

(73) Assignee: Southwest Sciences Incorporated, Santa Fe, NM (US)

(*) Notice: Subject to any disclaimer, the term of this patent is extended or adjusted under 35 U.S.C. 154(b) by 193 days.

(21) Appl. No.: 09/640,566

(22) Filed: Aug. 16, 2000

Related U.S. Application Data

(60) Provisional application No. 60/149,503, filed on Aug. 17, 1999.

(51) Int. Cl.[7] ................................................. G01J 3/42

(52) U.S. Cl. ......................................................... 702/30

(58) Field of Search ............................ 702/30; 250/339, 250/291, 370; 329/325; 356/308, 346; 235/151

(56) References Cited

U.S. PATENT DOCUMENTS

| | | | | |
|---|---|---|---|---|
| 4,410,273 A | * | 10/1983 | Mantz et al. | 250/339.03 |
| 5,047,636 A | * | 9/1991 | Farrar et al. | 250/291 |
| 5,308,982 A | | 5/1994 | Ivaldi et al. | |
| 5,742,399 A | | 4/1998 | McAndrew | |
| 5,959,730 A | | 9/1999 | Wang et al. | |
| 6,031,609 A | * | 2/2000 | Funk et al. | 356/308 |
| 6,035,246 A | * | 3/2000 | Wagner | 250/339.05 |
| 6,130,925 A | * | 10/2000 | Ichimaru et al. | 329/325 |

OTHER PUBLICATIONS

Albritton, D.L., et al., "Molecular Spectroscopy: Modern Research," vol. II, K.N. Rao, editor; Academic Press, pp 1–67 (1976).

Booksh, K.S., et al., "Mathematical Alignment of Wavelength–Shifted Optical Spectra for Qualitative and Quantitative Analysis," *Applied Spectroscopy*, vol. 50, No. 2, pp 139–147 (1996).

Fried, A., et al., "Tunable Diode Laser Ratio Measurements of Atmospheric Constituents by Employing Dual Fitting Analysis and Jump Scanning," *Applied Optics*, vol. 32, No. 6, pp 821–827.

Gulluk, T., et al., "A High–Frequency Modulated Tunable Diode Laser Absorption Spectrometer for Measurements of $CO_2$, $CH_4$, $N_2O$, and CO in Air Samples of a Few $cm^3$," *Rev. Sci. Instrum.*, vol. 68, No. 1, pp 230–239 (Jan. 1997).

Lubken, F.J., et al., "The Effect of Water Vapour Broadening on Methane Eddy Correlation Flux Measurements," *J of Atmospheric Chem.*, vol. 13, pp 97–108 (1991).

May, R.D., "Correlation–Based Technique for Automated Tunable Diode Laser Scan Stabilization," *Rev. Sci, Instrum.*, vol. 63, No. 5, p 2922–226 May 1992).

Press, W.H., et al., "Numerical Recipes in C: The Art of Scientific Computing" Chapter 3, Cambridge Univ Press, New York (1992) pp 105–128.

(List continued on next page.)

*Primary Examiner*—John Barlow
*Assistant Examiner*—Tung Lau
(74) *Attorney, Agent, or Firm*—Jeffrey D. Myers

(57) ABSTRACT

A spectrographic apparatus and method comprising providing a spectrometer, digitizing a sample spectrum in a spectral range that includes at least one feature of an analyte, and comparing, via a linear least squares computation, the sample spectrum to a spectrum known to closely approximate the sample spectrum at a reference condition and to one or more derivatives of the known spectrum taken with respect to one or more parameters of the reference condition.

38 Claims, 3 Drawing Sheets

OTHER PUBLICATIONS

Riris, H., et al., "Design of an Open Path Near–Infrared Diode laser Sensor: Application to oxygen, Water, and Carbon Dioxide Vapor Detection," *Applied Optics*, vol. 33, No. 30, pp 7059–7066 (Oct. 20, 1994).

Rothman, L.S., et al., The HITRAN Molecualr Spectroscopic Database and HAWKS (HITRAN Atmospheric Workstation): 1996 Edition, *Geo Phys: QC 350–J65,[J. Quant. Spectrosc. Radiat. Transfer* vol. 60 pp 665–710 (1998)].

Roths, J., et al., "four–Laser Airborne Infrared Spectrometer for Atmospheric Trace Gas Measruements," *Applied Optics*, vol. 35, No. 36, pp 7075–7084 (Dec. 20, 1996).

Scott, D.C., et al., "Airborne Laser Infrared Absorption Spectrometer (ALIAS–II) for in situ Atmospheric Measurements of $N_2$), $Ch_4$, CO, HCl, and $NO_2$ from Balloon or Remotely Piloted Aircraft Platforms," *Applied Optics*, vol. 38, No. 21, pp 4609–4622 (Jul. 20, 1999).

\* cited by examiner

FILTERING TO MEASURE GAS CONCENTRATIONS FROM SPECTRAL FEATURES

CROSS-REFERENCE TO RELATED APPLICATIONS

This application claims the benefit of the filing of U.S. Provisional Patent Application Serial No. 60/149,503, entitled "Filtering Method for Measuring Gas Concentrations from Spectral Features", filed on Aug. 17, 1999, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract No. NAS2-14367 awarded by the U.S. National Aeronautics and Space Administration.

BACKGROUND OF THE INVENTION

1. Field of the Invention (Technical Field)

The present invention relates to digital signal processing of spectral data, particularly for measuring gas concentrations from spectral features.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

In order to detect or quantify the amount of a substance from a measurement of its spectrum, such as a diode laser spectrum of a single absorption line of a trace gas, several approaches have been used. The simplest is to measure the peak height at the wavenumber of its maximum absorbance, which is related to the gas concentration by Beer's Law. This method is simple to implement by hand or by computer. However, it makes use of only a small portion of the recorded spectrum and it is sensitive to changes in the baseline signal that may be present in the absence of the analyte. A better method to measure the line amplitude uses the entire recorded spectrum by minimizing the squared deviation between the observed spectrum and a model spectrum. This method is called least squares, and it is widely used in the literature.

When the adjustable parameters in the model spectrum are linear multipliers of some basis functions, then linear least squares analysis can be used. A linear least squares solution can be found in a single step of calculations without the need for iterative algorithms. As a result, linear least squares is fast and robust. The other least squares approach is non-linear least squares. There is no general formula for the solution of a nonlinear least squares problem. Non-linear least squares algorithms require initial guesses for the parameters, which are then adjusted interactively until a desired degree of accuracy is obtained. Non-linear least squares is much slower and less robust than the linear algorithm. However, with non-linear least squares, it is possible to optimize parameters such as the line width and the spectral location of the peak. Such parameters are not linear multipliers of basis functions.

Linear least squares is especially robust and simple to implement when the model does not change from spectrum to spectrum. A constant model arises when the line positions and line widths stay constant. When this condition is met, the most numerically intensive portion of the fit can be computed once; subsequent spectra can be analyzed using this pre-computed matrix, using simpler software on a lower cost processor.

Linear least squares is applied to determining concentrations from spectroscopy by postulating that the observed spectrum can be represented as the weighted sum of one or more spectral features plus background vectors. This postulate implies that both the wavelength or wavenumber position of the spectral feature and its characteristic width are known. However, the wavenumber position can change with time due to variations in spectrometers with temperature or other factors. The line width can change due to variations in the temperature, pressure, or composition of the sample to be measured. In order to accommodate these variations, several approaches have been developed.

D. C. Scott, et al., "Airborne laser infrared absorption spectrometer (ALIAS-II) for in situ atmospheric measurements of N2O, CH4, CO, HCl, and NO2 from balloon or remotely piloted aircraft platforms," *Applied Optics* 38, 4609–4622 (listed month of publication, July 1999), note that conventional least squares fitting is time consuming, requiring them to adopt a simpler processing strategy of measuring the peak to trough height of the demodulated signals from an airborne diode laser-based instrument. The analysis approach they take to deal with variations in the line width includes prior calculation of a grid of values of the peak to trough height as a function of both temperature and pressure, for unit concentration. However, their approach uses only three points on the spectrum—the maximum and two minima to determine the concentration. It is accurate only when the signal to noise ratio is high and when many digitized steps are sampled on the spectral peak. This in turn requires a fast digitization rate.

A. Fried, et al., "Tunable diode laser ratio measurements of atmospheric constituents by employing dual fitting analysis and jump scanning," *Applied Optics* 32, 821–827 (1993), note the improved precision of linear least squares for determining concentrations from spectra. However, to account for drift of the spectrum within the scan window, several fits are carried out using a variety of center positions, and the fit with the minimum least squares is selected. This method is only accurate to the nearest digital step, so that many digital steps are required.

J. Roths, et al., "Four-laser airborne infrared spectrometer for atmospheric trace gas measurements," *Applied Optics* 35, 7075–7084 (1996), show that shifts in the center position of a spectral line within a scan can result in increased variance in concentration measurements. They resolve this problem by digitizing the spectrum at closely spaced step intervals and by building a specialized circuit that shifts the peaks to co-align the center positions.

K. S. Booksh, et al., "Mathematical alignment of wavelength-shifted optical spectra for qualitative and quantitative analysis," *Applied Spectroscopy* 50, 139–147 (1996), describe the effects of wavenumber shifts of diode lasers when such lasers are used to excite Raman spectra. They introduce a two step procedure for aligning subsequent spectra, first aligning to the nearest digitized step, then using a Fibbonacci search of possible shifts to interpolate between digitized steps. Although the interpolation is very rapid, it is still an iterative scheme that requires a number of steps to improve the estimate of the line shift.

J. Ivaldi, et al., "Method and apparatus for comparing spectra," U.S. Pat. No. 5,308,982 (1994), note the effects on analytical precision of spectral shifts in atomic emission and infrared absorption spectroscopies. They disclose a method for least squares fitting of an unknown sample spectrum. In their method, the least squares model includes a vector corresponding to the derivative of the unknown sample spectrum as well as the usual vectors corresponding to the expected peak shape and the background. The derivative vector corrects for the spectral shift. However, this method requires recalculation of the derivative vector after each new measurement of a sample spectrum. As a result, for a continuous monitor, a new model matrix must be constructed and inverted to analyze each new spectrum. The matrix inversion step is usually the most computationally intensive part of the solution. Thus, the procedure disclosed by Ivaldi requires a more expensive, high speed computer for its implementation, or limitations on the update rate.

R. May, "Correlation-based technique for automated tunable diode laser scan stabilization," *Reviews of Scientific Instruments* 63, 2922–2926 (1992), describes a method for stabilizing the position of a spectral feature within a scan by using a cross-correlation of the observed spectrum with a reference spectrum that has the peak at the desired reference position, usually the center of the scan. The maximum value of the cross correlation occurs at a position equal to the wavenumber difference between the observed spectrum and the reference spectrum. Feedback is used to adjust the starting point of a subsequent scan to correct any drift of the position that is detected. The cross-correlation algorithm has good signal/noise properties but is relatively slow.

H. Riris, et al., "Design of an open path near-infrared diode laser sensor: application to oxygen, water, and carbon dioxide vapor detection," *Applied Optics* 33, 7059–7066 (1994), describe the stabilization of a symmetric spectral feature by measuring the amplitude on the left and right sides of the peak, near the half intensity points. The difference in amplitudes is proportional to spectral shift of the peak; again, feedback is used to stabilize the position. This approach is simple and computationally fast, but has the disadvantage that only a few points are used to determine the spectral shift, resulting in greater susceptibility to noise.

J. McAndrew, et al., "Method for stabilizing the wavelength in a laser spectrometer system," U.S. Pat. No. 5,742,399 (1998), describe an approach for stabilizing the peak position at its initial value using feedback, except that some other undisclosed algorithm is used instead of the cross-correlation; the computation limited the spectral scan repetition rate to 10 Hz or slower.

T. Guilluk, et al., "A high-frequency modulated tunable diode laser absorption spectrometer for measurements of $CO_2$, $CH_4$, $N_2O$, and CO in air samples of a few $cm^3$," *Reviews of Scientific Instruments* 68, 230–239 (1997), correct for spectral shifts by adjusting the triggering point of a transient digitizer, so that digitization of the current spectrum is based on the detected peak location in the most recently completed spectrum. This approach requires that only a small part of the scanned spectrum is digitized, thus, much of the scanned region is not available for analysis.

The present invention improves on the art by permitting correction of the concentration measurement for the effects of spectral shift without the need for using non-linear least squares, without abandoning the signal/noise advantages of the least squares technique, and without the need for high speed digitizers, custom circuitry, or high speed computers. It also permits correction of the concentration measurement for errors that can be introduced by changes in the line width of a single line, or by changes in the spectral shape or relative intensities of a band or group of lines as a result of changes in temperature, pressure, or other environmental variables. Furthermore, it provides a means for determining the spectral drift and for stabilizing the wavenumber of a diode laser or other tunable spectrometer element that provides high signal/noise and is computationally efficient.

SUMMARY OF THE INVENTION
(DISCLOSURE OF THE INVENTION)

The present invention is of a spectrographic apparatus and method comprising: providing a spectrometer; digitizing a sample spectrum in a spectral range that includes at least one feature of an analyte; and comparing, via a linear least squares computation, the sample spectrum to a spectrum known to closely approximate the sample spectrum at a reference condition and to one or more derivatives of the known spectrum taken with respect to one or more parameters of the reference condition. In the preferred embodiment, fit coefficients are employed corresponding to terms of the one or more derivatives to correct a concentration determined by the fit coefficient corresponding to the known spectrum. A derivative taken with respect to a center wavenumber of a spectral feature is preferably employed, and the spectral interval of the spectrometer is adjusted employing a weighting factor corresponding to a derivative with respect to wavenumber and negative feedback to stabilize a relative wavenumber position of a spectral peak by adjusting average position of the spectral interval, or the spectral interval of the spectrometer (preferably a diode laser spectrometer) is adjusted employing a weighting factor corresponding to a derivative with respect to wavenumber divided by a weighting factor corresponding to a spectral feature, with the resulting ratio being used with negative feedback to stabilize a relative wavenumber position of a spectral peak by adjusting average position of the spectral interval. Other derivatives usefully employed include derivatives taken with respect to a line width of a spectral feature and derivatives of the sample spectrum taken with respect to analyte temperature and/or pressure. The spectrometer is preferably a diode laser spectrometer, Fourier transform spectrometer, or dispersive spectrometer. The comparing is preferably done by generating a model matrix, multiplying the model matrix by its transpose, inverting the resulting matrix, multiplying this inverted matrix by the transpose of the model matrix, and storing the second resulting matrix (all preferably on a first processor), then using the stored matrix to multiply a sequence of observed spectra to obtain a sequence of concentration measurements (preferably on a second processor, most preferably a digital signal processor or microcontroller). Model spectra are preferably computed at a number of environmental conditions and the known spectrum is preferably the model spectrum whose environmental conditions most closely match those of the analyte.

A primary object of the present invention is to provide: (1) a means to correct the concentration measurement for the effects of spectral shift without the need for using non-linear least squares, without abandoning the signal/noise advantages of the least squares technique, and without the need for high speed digitizers, custom circuitry, or high speed computers; (2) a means for correcting the concentration measurement for errors that can be introduced by changes in the line width of a single line, or by changes in the spectral shape or relative intensities of a band or group of lines as a result of changes in temperature, pressure, or other environmental variables; and (3) a means for determining the spectral drift and for stabilizing the wavenumber of a diode laser or other tunable spectrometer element that provides high signal/noise and is computationally efficient.

A primary advantage of the present invention is that the least squares model and the matrix inverse can be computed before the spectrum is acquired.

A further advantage of the present invention is that accurate results can be obtained with the linear least squares approach even when environmental changes cause small changes in the spectral position or line width of the spectral feature being monitored.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
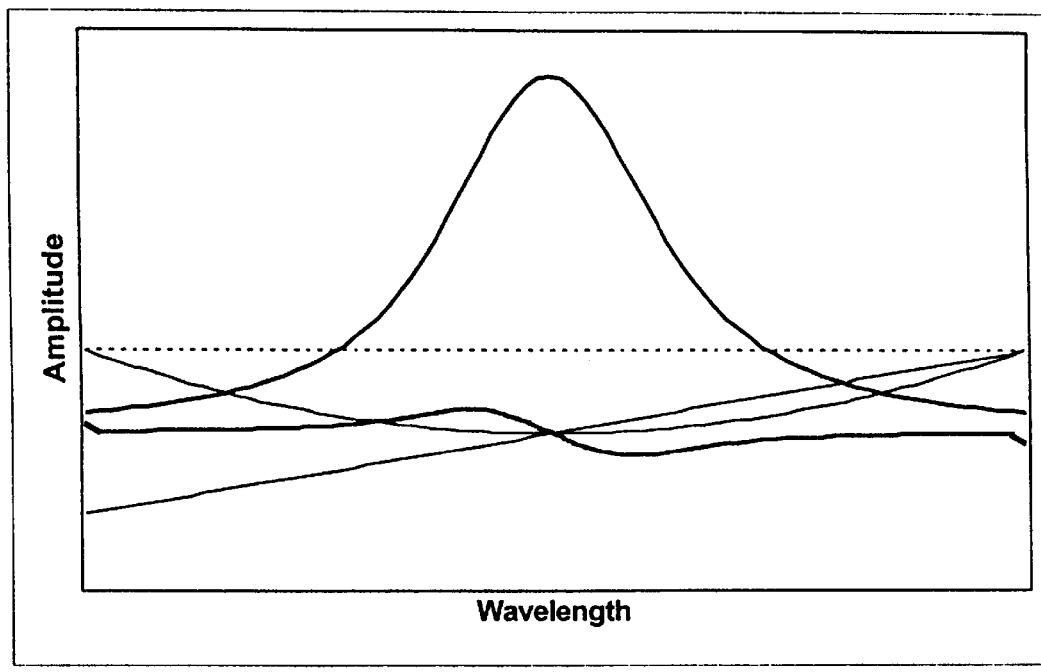
FIG. 1 is an illustration of the vectors used to fit to a shifted, broadened spectral line according to the invention, namely the basis vectors for flexible least squares fitting, including the line shape and its derivative with respect to wavenumber (heavy lines) and the three background vectors (dotted, lighter lines)

DESCRIPTION OF THE PREFERRED EMBODIMENTS (BEST MODES FOR CARRYING OUT THE INVENTION)

This invention is of a method of and apparatus for digital signal processing of spectral data using a linear least squares algorithm to fit spectral peaks. The invention is computationally rapid and sufficiently flexible to accommodate variations in the spectral parameters, such as peak position or peak width, without loss of accuracy in the computed concentration measurement. It is useful in laser monitoring of gases, Fourier transform spectroscopy, and other fields where spectral peaks are detected or quantified. It can be used to adjust the wavenumber of a laser to stabilize the position of a peak within a spectrum in a manner equivalent to line locking.

The invention provides a method and apparatus for determining the concentration of an analyte or analytes in a sample by analysis of a spectrum of that sample. The analysis uses linear least squares with a model that includes the expected spectral shape of the analyte or analytes under reference conditions of temperature and pressure, the derivative of the analyte spectral shape taken with respect to the environmental variable to be corrected (e.g. with respect to wavenumber to correct for spectral shift), and optional background terms. The least squares computation determines the weighting factors for each component of the model. The weighting factors corresponding to the spectral shape and its derivatives are used to determine an estimate of the concentration that is largely free of errors due to small variations in the environmental variables.

In addition, the invention provides for an optional means of stabilizing the spectral feature within a spectrum using feedback. This is accomplished using the ratio of two weighting factors determined from the least squares fit: the weighting factor for the derivative with respect to wavenumber and the weighting factor for the spectral shape.

The invention will be illustrated with the example of a diode laser spectrometer for detecting trace gases, However, the novelty of the present invention consists of the manner in which the computer or other signal processing device analyzes the spectral data to determine concentration or detect the presence of some chemical species. The same method could be applied to the analysis of any digitized spectrum of a gas, liquid, or solid, including absorption spectra, emission spectra, Raman spectra, fluorescence spectra, or nuclear magnetic resonance spectra obtained with appropriate spectrometers, and containing one or more spectral features of the analyte. The data points in the spectra can be acquired sequentially or simultaneously. The spectrometer output amplitude is preferably digitized and ported to a computer or other computational device. This device in turn performs the calculations described in detail below and then is used to indicate the concentration or presence of some gas or other analyte by means of suitable indicators, outputs, or alarms.

A diode laser spectrometer consists of a diode laser which can be tuned in wavenumber by adjusting its temperature and injection current, electronics to control the current and temperature of the laser, optics for collimating and directing the laser beam, an electrical ramp generator which ramps the current and thereby ramps the laser beam's wavenumber, an optional beam splitter, at least one detector capable of responding to the diode laser radiation, an optional background subtraction circuit, optional amplifiers, an analog to digital converter, and a computer or digital signal processor for analyzing the spectrum and storing or displaying the analyte concentration. The ramp and digitizer are synchronized, for instance by generating the ramp using a digital to analog converter that is controlled by the same processor that controls the analog to digital converter. The laser temperature and ramp width are chosen appropriately to record all or part of a spectrum that includes a characteristic feature of the analyte or analytes of interest.

The spectral line of a gas such as water vapor or methane can be modeled using the parameters tabulated in the HITRAN data base (Ontar Corp., North Andover, Mass.) and formulas described by L. S. Rothman, et al., "The HITRAN Molecular Spectroscopic Database and HAWKS (HITRAN Atmospheric Workstation): 1996 Edition," *J. Quant. Spectrosc. Radiat. Transfer* 60, 665–710 (1998). Such a calculation involves computing the Doppler width and the pressure broadened width of the spectral line using standard formulas. A Voigt function, representing the convolution of Doppler and pressure broadened contributions to the width of the line, is a good model for many spectral lines over a wide range of pressure from above atmospheric to low pressure. Alternatively, the model can be constructed by measuring the spectral line with good signal/noise at the reference conditions.

The actual spectral line observed by the diode laser spectrometer may differ slightly from the modeled line, due to slight shifts in the optical wavenumber of the diode laser or to changes in the temperature or pressure of the gas under study. Analyte concentrations still can determined using linear least squares by expanding the model to include derivatives of the spectral line. Each derivative is taken with respect to the experimental condition that can vary. Thus, if shifts of the optical wavenumber cause poor reproducibility of the concentration measurement, the derivative of the model spectral line shape with respect to laser wavenumber is included in the model. If environmental variations cause the line width to vary, then the derivative of the model spectrum with respect to line width is added to the model, evaluated near the expected operating conditions. The derivatives can be constructed analytically using the Voigt function or empirically by recording the spectral line at conditions of temperature or spectral range slightly displaced from the reference conditions, computing the difference between the reference and displaced spectra, and dividing this difference spectrum by the displacement.

The linear least squares analysis uses a matrix whose columns are the basis vectors. For a single spectral line at atmospheric pressure observed with a near-infrared diode laser, a good representation is given by six basis vectors, including a Lorentz line shape function, its derivative with respect to the laser wavenumber, its derivative with respect to line half-width, and three vectors of a quadratic background. The derivatives account for spectral drift due to small temperature fluctuations of the diode laser and line shape drift due to changes in atmospheric pressure, temperature, and relative humidity.

In matrix notation, the measured experimental spectrum y (of length typically about 100 points) is represented as the product of a 100×6 design matrix $X_{ij}$ (each column of which is one of the background basis vectors, the line shape vector, or its derivatives) multiplied by a coefficient vector p (length 6 in this case), plus experimental errors e The matrix equation is simply $$y = Xp + e \qquad (1)$$

When the expected errors in each element of y are uncorrelated and equally large, this can be solved (D. L. Albritton, et al., in "Molecular Spectroscopy: Modern Research," vol. II, K. N. Rao, ed., Academic Press, p. 1–67, 1976) for the desired parameters or weights p which minimize the errors as $$p = (X^T X)^{-1} X^T y = Uy \qquad (2)$$

where $X^T$ is the transpose of the matrix X. Standard methods can be used to compute the inverse matrix $(X^T X)^{-1}$, which is the most computationally expensive part of the algorithm. This time consuming step depends only on the model functions. It does not depend on the measured spectrum. Therefore, the matrix $U = (X^T X)^{-1} X^T$ need only be computed once then stored. Thereafter, it can be used and re-used to compute the best parameters for an arbitrary number of spectral observations, provided the changes in the spectral line shape are sufficiently small that the corrections provide the needed accuracy. As discussed below, the use of the derivatives in the model and a polynomial correction leads to a wide range of shifts and line widths of the spectra for which U can be applied to obtain accurate concentration results.

U can be computed on a high power computing platform using a high level language (such as Matlab, The Math Works, Inc., Natick, Mass.) and then ported to a low cost digital signal processing system that performs the computations on a succession of measurements, for instance using the serial port of a PC to transfer U to the memory of a DSP system from Texas Instruments. Subsequently, U acts as a filter for estimating the p coefficients from the spectrum. Each value $p_i$ is found by taking the dot product of row i of U with the spectrum y, or all the values of p can be found using the matrix multiplication shown on the far right hand side of Eq. 2. The multiply and accumulate steps of the dot product execute rapidly on a digital signal processor.

The coefficient $p_1$, the weighting factor for the spectral line, provides a "first order" measure of the concentration of trace gas. However, the least squares algorithm systematically underestimates the concentration if the modeled spectral line doesn't perfectly overlap the observed spectral line or if the line shape differs from the theoretical model. As noted by Lubken et al., "The effect of water vapor broadening on methane eddy correlation flux measurements", J. Atmos. Chem. 13, 97–108 (1991), such systematic errors can cause serious problems in eddy correlation measurements, for example.

The coefficient of $p_2$, which corresponds to the derivative of the spectral line with respect to wavenumber, is proportional to the product of the wavenumber difference between the observed and the modeled spectral line, times the amplitude of the measured spectral line. Likewise the coefficient $p_3$ is proportional to the difference between the line widths times the line amplitude of the measured spectrum. The $p_1$, $p_2$ and $p_3$ coefficients can be used to correct errors in the estimate of the gas concentration using a multi-dimensional polynomial expansion in each derivative parameter:

$$Conc = p_1 \times \left(1 + a\frac{p_2^2}{p_1^2} + b\frac{p_3^2}{p_1^2} + c\frac{p_2^2 p_3}{p_1^3} + \ldots \right) \qquad (3)$$

Here Conc is the best estimate of the concentration taken from the spectrum, a, b and c are constants that can be adjusted empirically to obtain good agreement with a calibration gas or with the theoretical gas concentration used in the simulation. As indicated in Eq. 3, higher order terms of the polynomial can be included to improve the estimate of the concentration. Alternatively, another functional form of the correction in terms of $p_1$, $p_2$, and $p_3$ might be preferred over a polynomial, such as a rational function (W. H. Press, et al., *Numerical Recipes in C: The Art of Scientific Computing* ch. 3, Cambridge University Press, New York (1992). The linear terms in the expansion are not shown in Eq. 3 as they have been found to be identically zero, as expected because the reference spectrum is the best approximation of the spectrum under the reference conditions. The value of Conc can be filtered, displayed, plotted, or used to drive an alarm.

TABLE I

| | Peak position (cm-1) | Pressure width (cm-1) | P1 | P2 | P3 | Conc | Conventional |
|---|---|---|---|---|---|---|---|
| 1 | 0.00 | 0.20 | 1.00E+00 | 0.00E+00 | 0.00E+00 | 1.000 | 1.000 |
| 2 | 0.01 | 0.20 | 1.00E+00 | 9.95E-03 | -1.78E-03 | 0.998 | 0.998 |
| 3 | 0.02 | 0.20 | 1.01E+00 | 1.96E-02 | -7.40E-03 | 1.002 | 0.990 |
| 4 | 0.04 | 0.20 | 1.03E+00 | 3.71E-02 | -2.87E-02 | 0.998 | 0.960 |
| 5 | 0.08 | 0.20 | 1.10E+00 | 6.00E-02 | -9.42E-02 | 1.005 | 0.860 |
| 6 | 0.00 | 0.21 | 9.99E-01 | -2.48E-07 | -9.57E-03 | 0.999 | 0.970 |
| 7 | 0.00 | 0.22 | 9.98E-01 | -9.70E-07 | -1.80E-02 | 1.000 | 0.953 |
| 8 | 0.00 | 0.24 | 9.92E-01 | -3.49E-06 | -3.30E-02 | 0.997 | 0.910 |
| 9 | 0.00 | 0.19 | 9.99E-01 | -3.50E-07 | 1.06E-02 | 1.000 | 1.030 |
| 10 | 0.00 | 0.18 | 9.97E-01 | -1.40E-06 | 2.22E-02 | 0.999 | 1.050 |
| 11 | 0.00 | 0.16 | 9.88E-01 | -6.60E-06 | 4.90E-02 | 1.000 | 1.110 |
| 12 | 0.04 | 0.18 | 1.04E+00 | 4.28E-02 | -1.36E-02 | 1.000 | 1.010 |
| 13 | -0.04 | 0.18 | 1.04E+00 | -4.28E-02 | -1.44E-02 | 1.000 | 1.010 |
| 14 | -0.04 | 0.22 | 1.02E+00 | -3.23E-02 | -4.19E-02 | 0.998 | 0.920 |
| 15 | -0.04 | 0.22 | 1.02E+00 | 3.23E-02 | -4.19E-02 | 0.998 | 0.920 |

Table I shows results of a simulation of the spectral fit both with derivatives and a polynomial correction, and without derivatives or a polynomial correction. P1, P2, and P3 correspond to the terms multiplying the model spectral vector, its derivative taken with respect to center wavenumber, and its derivative taken with respect to line width. The reference conditions were a concentration of unity, Doppler component of the line width of 0.02 cm$^{-1}$, pressure broadened component of the line width of 0.20 cm$^{-1}$, and a relative peak center position of 0 cm$^{-1}$, within a scan range of 1 cm$^{-1}$. The values of center position and pressure broadening component used to generate the 15 synthetic "observed" spectra are shown in columns two and three; the Doppler component was fixed at 0.02 cm$^{-1}$. "Conc" is the value of concentration computed using a polynomial in P1, P2, and P3, following Eq. 3. Empirically, it was found that the correction terms were a=−20 (cm$^{-1}$)$^2$, b=5 (cm$^{-1}$)$^2$, and c=250 (cm$^{-1}$)$^3$. "Conventional" indicates the fit results of a conventional least squares fit without derivatives. The corrected concentration values show a spread of less than 1%, whereas the conventional approach has a range of more than 10%. Also, the root mean squared error of the fit is reduced.

In another test of this approach, synthetic Lorentzian spectra were generated with line half-widths differing by ±5% from that of the model. Use of the derivative term in the fit together with a Taylor series correction reduced the concentration error to less than 0.1%, a factor of 50 improvement.

In an experimental test, data were measured using a diode laser absorption spectrometer operating near 1650 nm to probe a transition of methane diluted in nitrogen. The pressure of the methane/nitrogen mixture was varied over the range from 98 to 112 kPa. The resulting spectra were fit to a model consisting of a Lorentz function, its derivative with respect to line width, and three terms of a quadratic background. Compared to a conventional least squares fit without the derivative correction, the flexible least squares fit showed substantially reduced systematic error with little or no increase in the random error of the estimated concentration. The ramp rate was 150 Hz, and the algorithm was capable of analyzing each individual spectrum.

Thus, by adding derivatives to the fitting matrix, the advantages of a fast, simple linear least squares algorithm are maintained without sacrificing accuracy even when the line position or line shape varies around its expected value. This flexible least squares approach permits the use of lower cost digital signal processors for data analysis. For a stand-alone instrument designed to work at an even wider range of temperatures or pressures than can be accommodated by this derivative fitting approach, it may prove advantageous to compute several matrices U, each optimized for certain conditions. At run time, the software would choose the best value of U based on user input, measurement of the environment, or goodness of fit. This approach permits even greater flexibility without requiring much computational power, although with a small increase in the demand for memory.

Naturally, for the broad range of possible spectrometers to which this invention can be applied, no single model of the spectrum is appropriate. In each individual case, to a conventional fit (which includes line shape functions and background functions) one simply adds the derivatives of the model line shape taken with respect to environmental variables. Thus, the first column of X is the expected spectrum, the second column is the derivative of the spectrum with respect to a first environmental variable, the third column is the derivative with respect to a second environmental variable, and so on. For example, the derivative of the line shape with respect to optical depth could be computed near some reference optical depth. Then accurate concentrations could be determined even when the spectra are outside the linear range of Beer's law. As another example, to fit a spectrum that contains two lines from the same gas whose relative intensities depend on temperature, include a parameter multiplying the sum of the two line shapes at a reference temperature and a second parameter multiplying the derivative of the spectrum with respect to temperature, evaluated at the reference temperature. This second parameter could then be used to correct the concentration using a power series expansion similar to Eq. 3. It would also provide a measure of the deviation of the temperature from the reference condition.

The value of $p_2$ (the weighting factor corresponding to the derivative of the spectral line with respect to wavenumber) can be used to stabilize the wavenumber position of the peak within the spectrum. The ratio $p_2/p_1$ is proportional to the shift of the observed line away from the target position given by the modeled line. This ratio can be multiplied by a gain factor and the result can be used to adjust the operating point of the spectrum, for instance by adding an offset to a computer generated ramp that scans the spectrometer. In the case of a diode laser, the starting current for the scan can be adjusted. The gain factor is chosen so that the feedback is negative and does not result in oscillation of the center wavenumber. Except that the correction is found from the ratio of the fit parameters, this approach is equivalent to the approach described by May. The "ramp locking" procedure is equivalent to laser line locking using modulation methods, except that the time scale for the ramp may be slower than that of the modulation typically used in line locking, and the least squares algorithm uses all the information in the spectrum, not just a single Fourier component.

Figure 2:
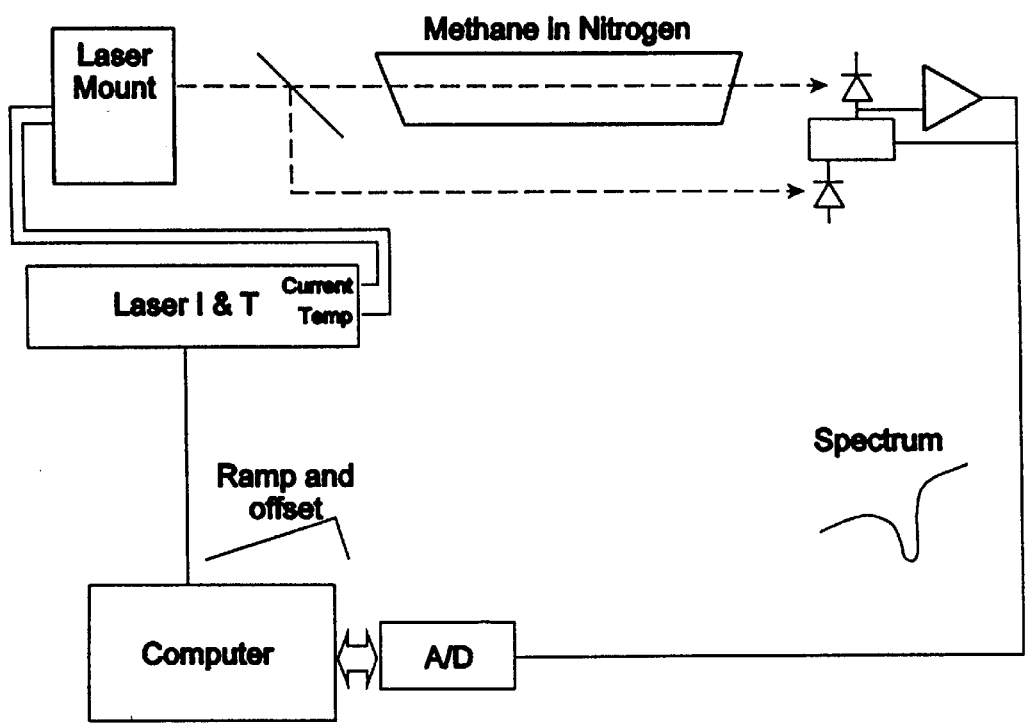
FIG. 2 is a schematic diagram of the diode laser apparatus used to test the method of the invention, namely a diode laser spectrometer used to test the laser wavenumber stabilization method using the derivative of the spectral line with respect to wavenumber.
Figure 3:
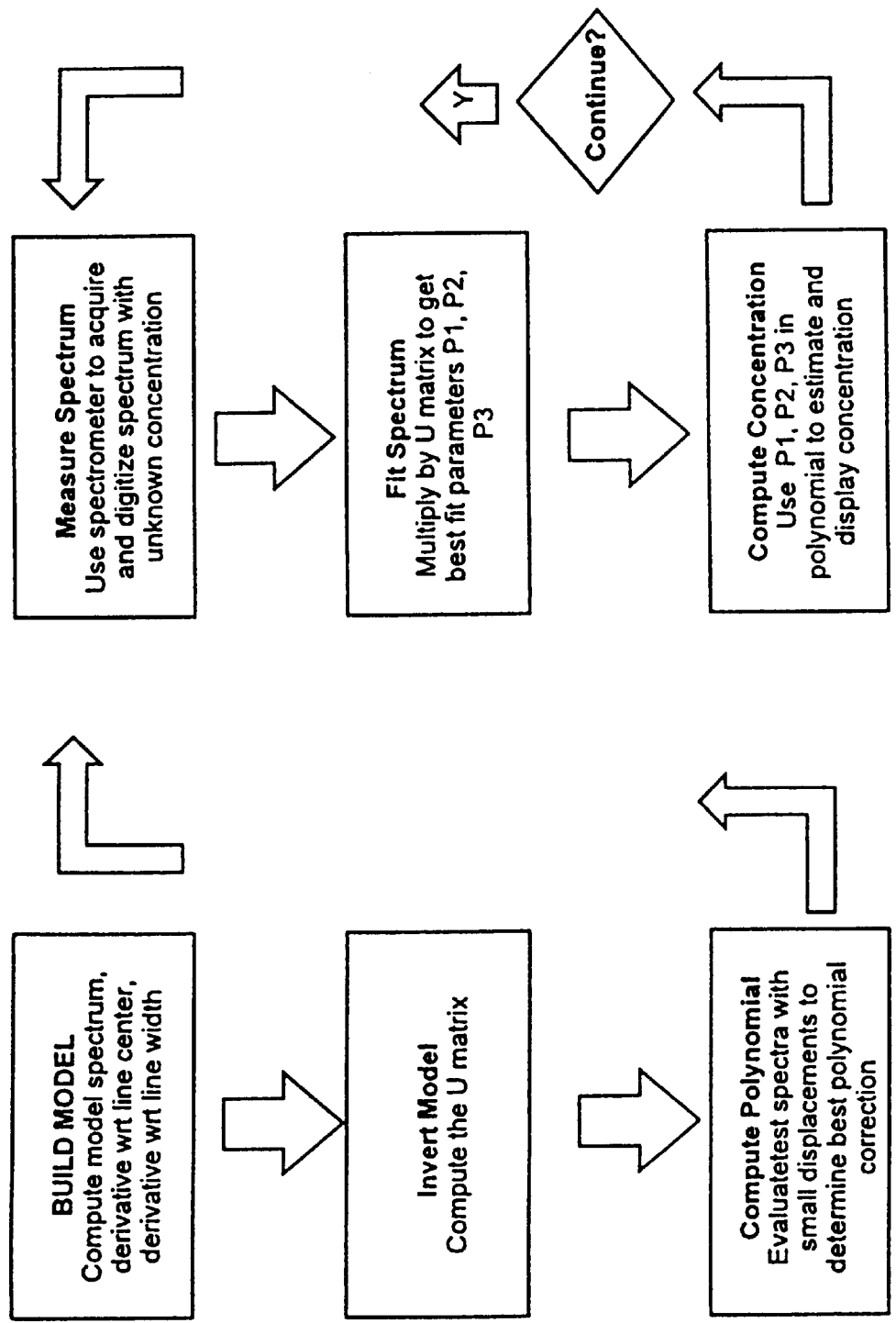
FIG. 3 is a flowchart of the preferred method of the invention.

An experimental test of the least-squares based locking approach was undertaken. The error signal was derived from a sample of methane at atmospheric pressure probed by a diode laser operating at 1650 nm using the spectrometer shown in FIG. 2. An integrating feedback loop was used in which the estimated wavenumber error as determined from $p_2/p_1$ was summed from scan to scan, and the sum was multiplied by a gain factor and used to correct the starting point of the ramp. The gain factor was manually adjusted to give negative feedback without introducing oscillation. Stability of 6 MHz ($5.5 \times 10^{-5}$ nm) was measured inside the loop, far less than either the atmospheric pressure broadened line width (5,400 MHz) or the step size of the spectral sweep (290 MHz). The code for the locking routine was easily implemented on a digital signal processor (TMS 320 C5x, Texas Instruments) and it operated at an update rate of 3 kHz. The update rate was limited not by the execution speed of the least squares fitting algorithm but by the speed of the analog to digital converter used to collect the spectra.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An instrument comprising a spectrometer, means for digitizing a sample spectrum in a spectral range that includes at least one feature of an analyte, and linear least squares computing means for comparing the sample spectrum to a reference spectrum known to closely approximate the sample spectrum at a reference condition and to one or more derivatives of the known reference spectrum taken with respect to one or more parameters of the reference condition, and wherein the linear least squares computing means employs a derivative taken with respect to a center wavanumber of a reference spectral feature.

2. The instrument of claim 1 wherein the linear least squares computing means employs fit coefficients corresponding to terms of the one or more derivatives to correct a concentration determined by the fit coefficient corresponding to the known spectrum.

3. The instrument of claim 1 wherein the spectrometer comprises means for adjusting spectral interval employing a weighting factor corresponding to a derivative with respect to wavenumber and negative feedback to stabilize a relative wavenumber position of a spectral peak by adjusting average position of the spectral interval.

4. The instrument of claim 1 wherein the spectrometer comprises means for adjusting spectral interval employing a weighting factor corresponding to a derivative with respect to wavenumber divided by a weighting factor corresponding to a spectral feature, with the resulting ratio being used with negative feedback to stabilize a relative wavenumber position of a spectral peak by adjusting average position of the spectral interval.

5. The instrument of claim 4 wherein the spectrometer comprises a diode laser spectrometer.

6. The instrument of claim 1 wherein the linear least squares computing means employs a derivative taken with respect to a line width of a reference spectral feature.

7. The instrument of claim 1 wherein the linear least squares computing means employs a derivative of the reference spectrum taken with respect to a reference analyte temperature.

8. The instrument of claim 1 wherein the linear least squares computing means employs a derivative of the reference spectrum taken with respect to a reference analyte pressure.

9. The instrument of claim 1 wherein the spectrometer comprises a spectrometer selected from the group consisting of diode laser spectrometers, Fourier transform spectrometers, and dispersive spectrometers.

10. The instrument of claim 1 wherein the linear least squares computing means comprises means for generating a model matrix, multiplying the model matrix by its transpose, inverting the resulting matrix, multiplying this inverted matrix by the transpose of the model matrix, and storing the second resulting matrix.

11. The instrument of claim 10 wherein the linear least squares computing means additionally comprises means for using the stored matrix to multiply a sequence of observed spectra to obtain a sequence of concentration measurements.

12. The instrument of claim 11 wherein the generating, multiplying, inverting, multiplying, and storing means comprises a first processor, and the means for using the stored matrix comprises a second processor.

13. The instrument of claim 12 wherein the second processor comprises a processor selected from the group consisting of digital signal processors and microcontrollers.

14. The instrument of claim 1 wherein the linear least squares computing means comprise model spectra computed at a number of environmental conditions and means for selecting the known spectrum as the model spectrum whose environmental conditions most closely match those of the analyte.

15. A spectrographic method comprising the steps of:
   a) providing a spectrometer;
   b) digitizing a sample spectrum in a spectral range that includes at least one feature of an analyte; and
   c) comparing, via a linear least squares computation, the sample spectrum to a reference spectrum known to closely approximate the sample spectrum at a reference condition and to one or more derivatives of the known reference spectrum taken with respect to one or more parameters of the reference condition; and
   wherein the comparing step comprises employing a derivative taken with respect to a center wavenumber of a reference spectral feature.

16. The method of claim 15 wherein the comparing step comprises employing fit coefficients corresponding to terms of the one or more derivatives to correct a concentration determined by the fit coefficient corresponding to the known spectrum.

17. The method of claim 15 additionally comprising the step of adjusting spectral interval of the spectrometer employing a weighting factor corresponding to a derivative with respect to wavenumber and negative feedback to stabilize a relative wavenumber position of a spectral peak by adjusting average position of the spectral interval.

18. The method of claim 15 additionally comprising the step of adjusting spectral interval of the spectrometer employing a weighting factor corresponding to a derivative with respect to wavenumber divided by a weighting factor corresponding to a spectral feature, with the resulting ratio being used with negative feedback to stabilize a relative wavenumber position of a spectral peak by adjusting average position of the spectral interval.

19. The method of claim 18 wherein the providing step comprises providing a diode laser spectrometer.

20. The method of claim 15 wherein the comparing step comprises employing a derivative taken with respect to a line width of a reference spectral feature.

21. The method of claim 15 wherein the comparing step comprises employing a derivative of the reference spectrum taken with respect to a reference analyte temperature.

22. The method of claim 15 wherein the comparing step comprises employing a derivative of the reference spectrum taken with respect to a reference analyte pressure.

23. The method of claim 15 wherein the providing step comprises providing a spectrometer selected from the group consisting of diode laser spectrometers, Fourier transform spectrometers, and dispersive spectrometers.

24. The method of claim 15 wherein the comparing step comprises the computing steps of generating a model matrix, multiplying the model matrix by its transpose, inverting the resulting matrix, multiplying this inverted matrix by the transpose of the model matrix, and storing the second resulting matrix.

25. The method of claim 24 wherein the comparing step additionally comprises using the stored matrix to multiply a sequence of observed spectra to obtain a sequence of concentration measurements.

26. The method of claim 25 wherein the computing steps comprise executing the computing steps on a first processor, and the step of using the stored matrix comprises multiplying on a second processor.

27. The method of claim 26 wherein the step of using the stored matrix comprises multiplying on a second processor selected from the group consisting of digital signal processors and microcontrollers.

28. The method of claim 15 additionally comprising the steps of computing model spectra at a number of environmental conditions and selecting the known spectrum as the model spectrum whose environmental conditions most closely match those of the analyte.

29. An instrument comprising a spectrometer, means for digitizing a sample spectrum in a spectral range that includes at least one feature of an analyte, and linear least squares computing means for comparing the sample spectrum to a reference spectrum known to closely approximate the sample spectrum at a reference condition and to one or more derivatives of the known reference spectrum taken with respect to one or more parameters of the reference condition, and wherein the spectrometer comprises a spectrometer selected from the group consisting of diode laser spectrometers, Fourier transform spectrometers, and dispersive spectrometers.

30. An instrument comprising a spectrometer, means for digitizing a sample spectrum in a spectral range that includes at least one feature of an analyte, and linear least squares computing means for comparing the sample spectrum to a reference spectrum known to closely approximate the sample spectrum at a reference condition and to one or more derivatives of the known reference spectrum taken with respect to one or more parameters of the reference condition, and wherein the linear least squares computing means comprises means for generating a model matrix, multiplying the model matrix by its transpose, inverting the resulting matrix, multiplying this inverted matrix by the transpose of the model matrix, and storing the second resulting matrix.

31. The instrument of claim 30 wherein the linear least squares computing means additionally comprises means for using the stored matrix to multiply a sequence of observed spectra to obtain a sequence of concentration measurements.

32. The instrument of claim 31 wherein the generating, multiplying, inverting, multiplying, and storing means comprises a first processor, and the means for using the stored matrix comprises a second processor.

33. The instrument of claim 32 wherein the second processor comprises a processor selected from the group consisting of digital signal processors and microcontrollers.

34. A spectrographic method comprising the steps of:
a) providing a spectrometer;
b) digitizing a sample spectrum in a spectral range that includes at least one feature of an analyte; and
c) comparing, via a linear least squares computation, the sample spectrum to a reference spectrum known to closely approximate the sample spectrum at a reference condition and to one or more derivatives of the known reference spectrum taken with respect to one or more parameters of the reference condition; and
wherein the providing step comprises providing a spectrometer selected from the group consisting of diode laser spectrometers, Fourier transform spectrometers, and dispersive spectrometers.

35. A spectrographic method comprising the steps of:
a) providing a spectrometer;
b) digitizing a sample spectrum in a spectral range that includes at least one feature of an analyte; and
c) comparing, via a linear least squares computation, the sample spectrum to a reference spectrum known to closely approximate the sample spectrum at a reference condition and to one or more derivatives of the known reference spectrum taken with respect to one or more parameters of the reference condition; and
wherein the comparing step comprises the computing steps of generating a model matrix, multiplying the model matrix by its transpose, inverting the resulting matrix, multiplying this inverted matrix by the transpose of the model matrix, and storing the second resulting matrix.

36. The method of claim 35 wherein the comparing step additionally comprises using the stored matrix to multiply a sequence of observed spectra to obtain a sequence of concentration measurements.

37. The method of claim 36 wherein the computing steps comprise executing the computing steps on a first processor, and the step of using the stored matrix comprises multiplying on a second processor.

38. The method of claim 37 wherein the step of using the stored matrix comprises multiplying on a second processor selected from the group consisting of digital signal processors and microcontrollers.

* * * * *